United States Patent

[11] 3,628,175

[72] Inventor Jameson Dane Rigden
 Westport, Conn.
[21] Appl. No. 326,762
[22] Filed Nov. 29, 1963
[45] Patented Dec. 14, 1971
[73] Assignee The Perkin-Elmer Corporation
 Norwalk, Conn.

[54] OPTICAL MASER HAVING CONCENTRIC RESERVOIRS AND CYLINDRICAL RESONATOR
13 Claims, 11 Drawing Figs.

[52] U.S. Cl. .................................................. 331/94.5,
 350/285
[51] Int. Cl. ....................................................... H01s 3/02
[50] Field of Search ........................................... 350/255,
 285, 6; 88/1 S; 331/94.5; 250/199; 332/7.51;
 330/4.3

[56] References Cited
UNITED STATES PATENTS
3,060,583 10/1962 Smith ................................ 88/1 S
3,149,290 8/1964 Bennett, Jr. et al. ........... 331/94.5
3,183,937 5/1965 Earley et al. ..................... 331/94.5
3,252,110 5/1966 Gustafson et al. .............. 331/94.5

OTHER REFERENCES

Cesium Gas C–W Laser Is Optically Pumped, Electronics–Vol. 35, No. 7, (April 27, 1962) pp. 23.

Arecchi, et al. HE—HE Optical Masers: Construction and Measurements. Alta Frequenza– Vol. 31, No. 11 (November, 1962) pp. 718– 721.

Primary Examiner—William L. Sikes
Attorney—Edward R. Hyde, Jr.

ABSTRACT: The disclosed optical maser comprises a capillary-size plasma tube communicating at each end with a pair of concentrically arranged gas reservoirs with electrodes therein for direct current operation. The reservoir end walls mount wedge-shaped Brewster angle windows relatively oriented at twice Brewster's angle. Adjustable mirror mounts beyond each window each include a mirror carried by a diaphragm; the mirrors, windows and plasma tube all being in physical alignment.

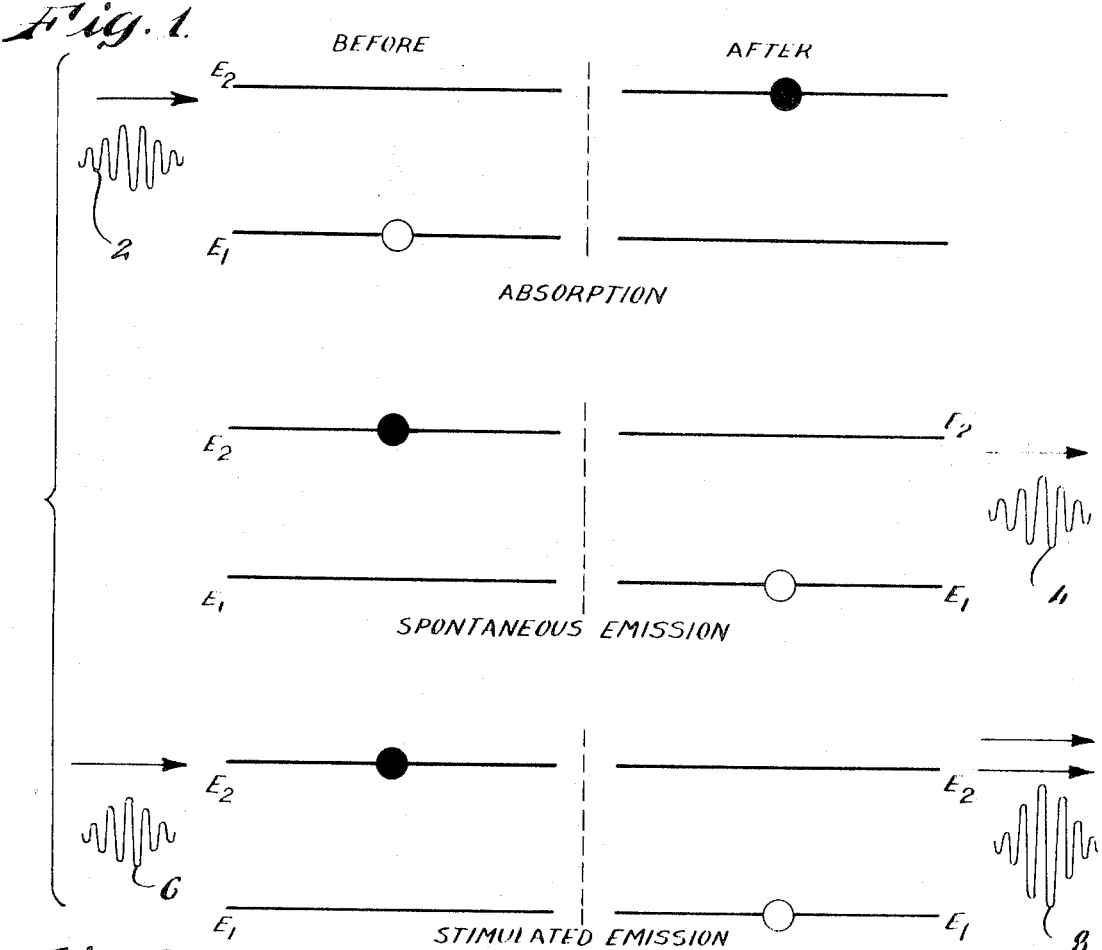
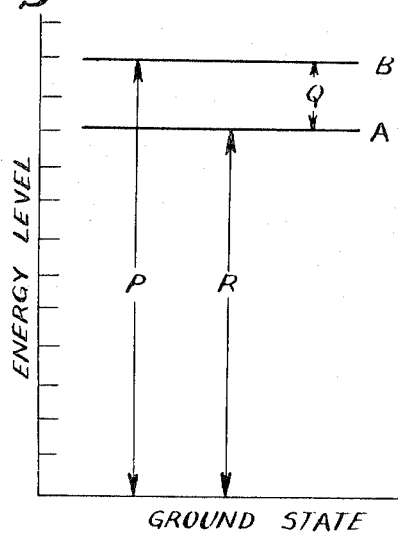
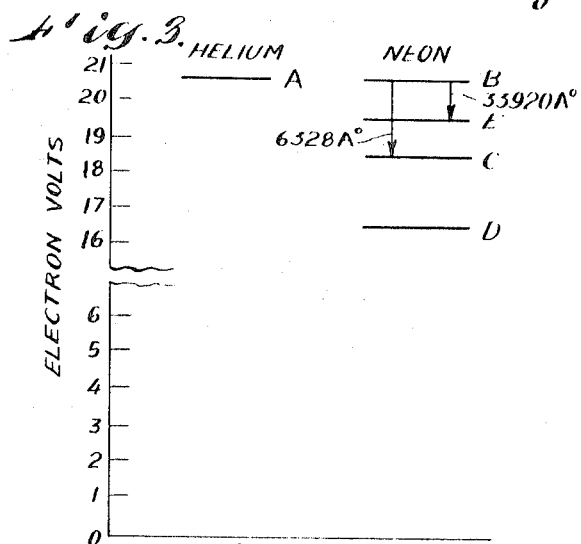

Patented Dec. 14, 1971
3,628,175
3 Sheets-Sheet 2
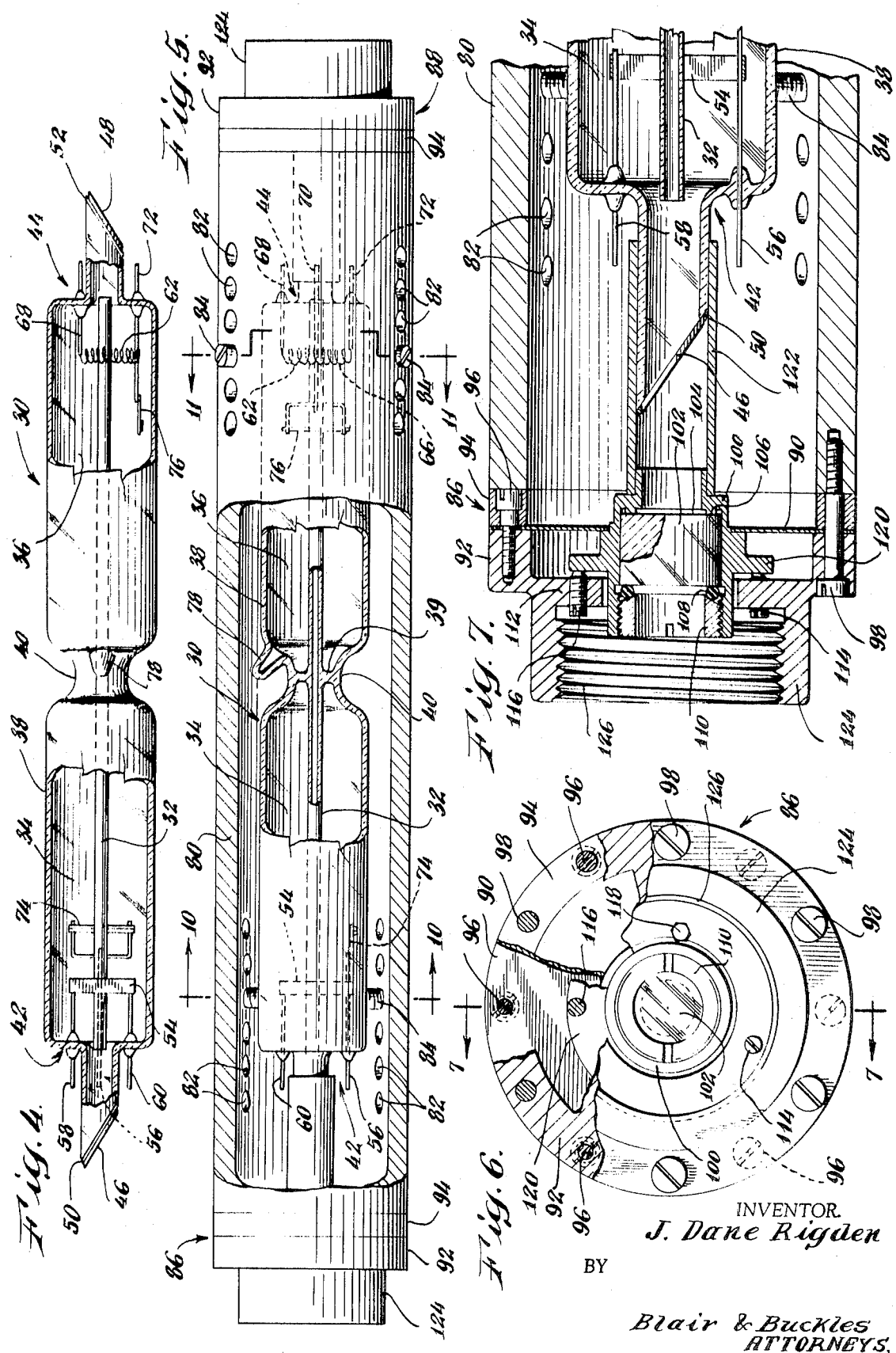
INVENTOR.
J. Dane Rigden
BY
Blair & Buckles
ATTORNEYS.

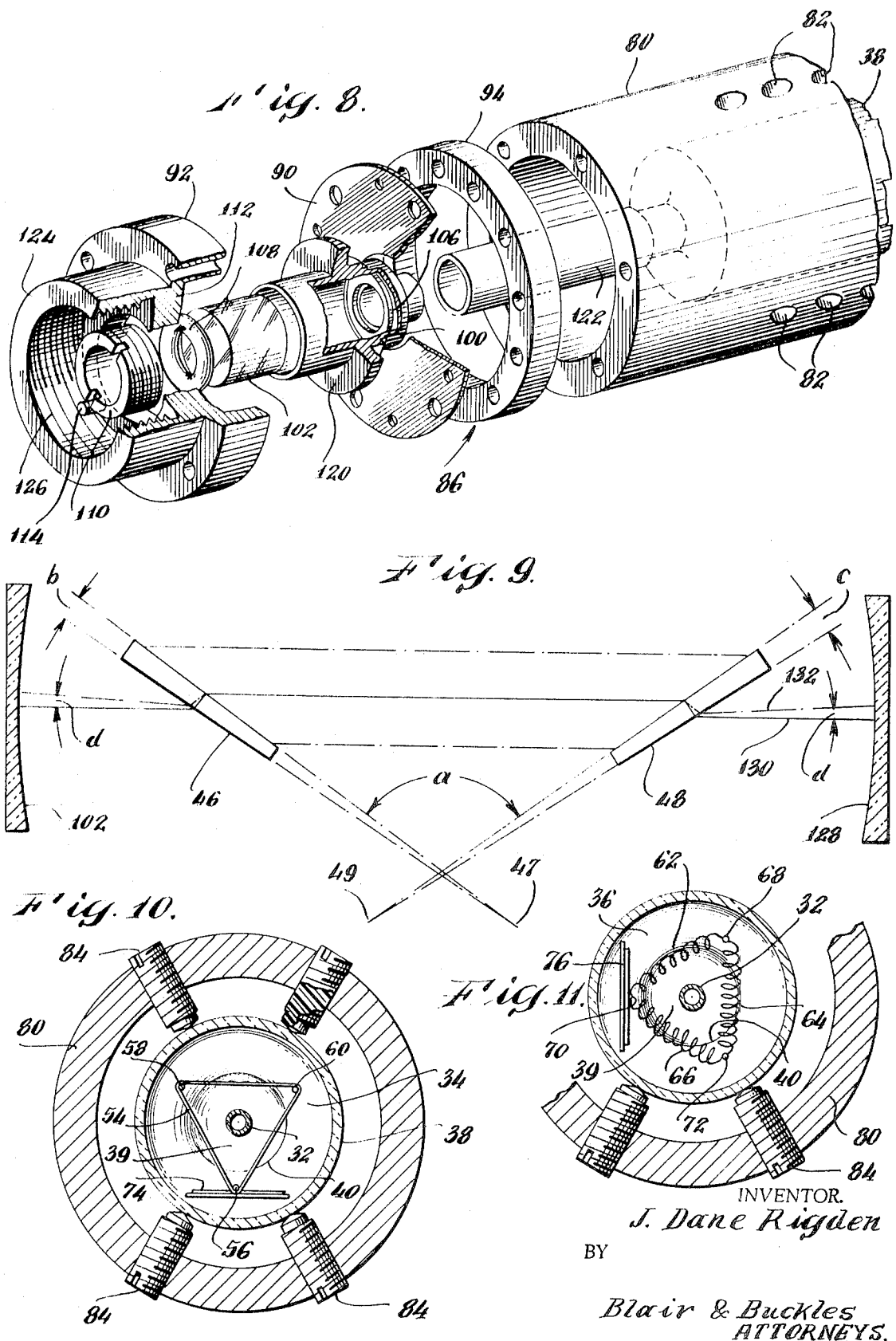

OPTICAL MASER HAVING CONCENTRIC RESERVOIRS AND CYLINDRICAL RESONATOR

This invention relates to optical masers and, more particularly, it relates to optical masers employing liquids or gases as the active media thereof. By way of example, a gaseous optical maser employing a mixture of helium and neon gases constructed according to the teachings of the invention is described in detail.

The optical masers of the present invention are, in essence, light sources. The difference between the optical masers of this invention and common light sources such as incandescent lamps and gas discharges (e.g., neon signs or lights) is in the character of the light produced and the manner in which the light is produced.

If the white light from an incandescent lamp passes through a narrow slit and then through a prism or diffraction grating and is allowed to fall on a white screen, a continuous spectrum will be observed. That is, the white light passing through the slit will be dispersed into its separate color constituents. The short wavelength, high-frequency, blue components will be seen at one end of the spectrum and the long wavelength, low-frequency, red components will be seen at the other end of the spectrum. The spectrum will be continuous, that is, all visible light frequencies will appear on the screen. Furthermore invisible light will also fall on the screen; ultraviolet beyond the blue edge of the visible spectrum and infrared beyond the red edge.

However, if light from a gas discharge such as a neon tube is passed through the slit and the prism or grating, the spectrum formed on the screen will not be the continuous spectrum of white light but will consist of discrete, separate lines parallel to the slit. Thus, the neon tube is only radiating light of certain discrete, individual wavelengths. Furthermore, each of the chemical elements when involved in a gas discharge will produce a different set of lines or "line spectrum."

If light from an incandescent lamp is passed through neon gas, then through a slit and a prism or grating and allowed to fall on the screen, dark lines will appear in the continuous spectrum of the incandescent lamp. These dark lines will appear at exactly the same positions where the bright lines from the neon gas discharge appeared. Thus, neon absorbs light at the same discrete wavelengths at which it emits light in a gas discharge. This is true of all elements. The bright lines are called an emission spectrum and the dark lines are called an absorption spectrum. Further, all chemical elements have different line spectrums, so they may be identified in this manner, i.e., by spectrum analysis.

The characteristic line spectrums of the elements were a great mystery until the early part of this century. Then a relationship was found between the wavelength (color) of light and the amount of energy associated with the light. It was also found that the electrons of an atom could only move in a limited number of orbits about the nucleus of the atom. Each of the orbits corresponds to a particular potential energy. A discrete amount of energy must be absorbed by an atom to raise one of its electrons to an orbit further out from its nucleus, that is, to a higher energy level. This can be done by absorbing light of the wavelength corresponding to that energy. In the same manner, an electron can move to an orbit closer to the nucleus by radiating light of a wavelength corresponding to the energy difference between the outer and the inner orbits. The greater the energy difference the shorter the wavelength of the light that may be absorbed or emitted.

Ordinary light sources are broadband noise generators that spread their output over a wide range of wavelengths. They do not furnish much power at any specific wavelength. Even gas-discharge lamps, such as neon lights which emit light at a restricted number of narrow lines in the spectrum, do not approach the efficiency of the best electronic oscillators in producing power at a single wavelength. Electronic oscillators for the production of electromagnetic waves of extremely short wavelengths, for example, infrared or visible light, are impractical for many reasons.

The production of light waves from a very small optical resonator in a manner analogous to the production of very short electromagnetic waves from a microwave resonator would seem to be the answer. However, it is not practical to fabricate a resonator of the small dimensions required. Accordingly, it has been suggested that use be made of the wide variety of atomic and molecular resonators that resonate at wavelengths through the entire infrared visible and ultraviolet spectrum. Such atomic resonators are, of course, used in gas-discharge lamps, but a single atom radiates very little power and radiates only intermittently. Large sources of energy of these short wavelengths may, however, be produced by synchronizing a large number of atoms to coact in the production of a very powerful wave. As we shall see, this may be accomplished by "stimulated" emission, which is the basis of maser operation.

Light waves, or photons, may be absorbed or emitted by an atom. When a photon is absorbed by an atom in its "ground" (normal, unexcited) state, the energy of the photon is converted to internal energy of the atom, thereby raising the atom to an "excited" state. After such excitation, the atom may radiate this energy spontaneously by emitting a photon to revert to the "ground" state or some state therebetween.

In this connection, it is important to bear in mind the phenomenon which transpires in creating an ordinary light spectrum. An atom in an excited state will normally decay to a lower energy level in a very short time, much less than a millionth of a second. It will do this spontaneously. This "spontaneous emission" of light waves at characteristic wavelengths, which correspond to the difference in atomic energy levels, produces the emission lines in the spectrums of the elements. For example, the atoms in a neon tube emit spontaneously at different times to produce light which, though comprising the characteristic wavelengths, consists of little wave trains or "photons" of the characteristic wavelengths which have no other relationship to each other. That is, they do not all begin and end at the same time, nor do they crest and trough at the same time, and, most important, they are radiated randomly in all directions.

But there is another important characteristic of atoms, to wit, when they are in an excited state, they can be stimulated to emit radiation of a characteristic wavelength when they are exposed to radiation of that wavelength. In this case, light is emitted in the direction of motion of the stimulating light. Furthermore, such emitted light is exactly in phase with the stimulating light, that is, the crests and troughs of the stimulating and emitted light waves occur at the same time—the waves are "in phase." Thus, when an atom in its excited state is struck by a photon having precisely the same energy that was previously absorbed by the atom, another photon is emitted to join the stimulating photon. This phenomenon is called "stimulated emission," wherein an incoming or striking photon may be augmented by a photon given off by the "excited" atom. The wave or photon so released will fall precisely in phase with the wave or photon that triggered its release. This is the basis of the maser principle.

In FIG. 1 of the drawings, stimulated emission is contrasted with absorption and spontaneous emission. In absorption, an atom in the "ground" state $E_1$, indicated by the open circle on the left, absorbs a photon or wave train indicated at 2 and is thereby "excited" and raised to the higher energy state $E_2$, indicated by the black dot at the right. In spontaneous emission an "excited" atom in the energy state $E_2$, indicated by the black dot at the left, radiates energy spontaneously, thereby emitting a single photon or wave train shown at 4. This has the save wavelength as the absorbed photon 2, and the atom reverts to the ground state as indicated by the open circle at the right. However, in the case of stimulated emission, an "excited" atom in energy state $E_2$, as indicated by the black circle at the left, may be stimulated if struck by a photon or wave train of the same wavelength as the absorbed photon 2 to give up its energy in reverting to the ground state. In that case, the "stored" photon "joins" the stimulating photon 6 as the atom reverts to the ground state indicated by the open circle at the right. This creates the wave train 8 of increased amplitude carrying twice the energy of the stimulating wave train. The resultant wave train 8 (i.e., two photons) of stimulated emission has the same wavelength as the stimulating photon or wave train 6.

In designing masers, it is necessary to create "an active" medium where most of the atoms are in an "excited" state. An electromagnetic wave of the proper high frequency, if passed through this mass of excited atoms, will stimulate them to produce a shower of photons in the above-described manner. In this active medium, there must be an excess of excited atoms, for in this way stimulated emission of photons will predominate over absorption as the atoms are returned to their ground state. Atoms in an active medium may be raised to an "excited" state by electromagnetic energy having a wavelength different from the stimulating wavelength. In this art, the supplying of energy to create "excited" atoms is called "pumping."

An atomic system such as this may be contained in a box having reflecting surfaces at its opposite ends; such a box may be termed a "cavity resonator." A spontaneously emitted wave starting at one end of the box may thus grow in amplitude due to stimulated emission until it reaches the other reflecting surface where it will be reflected back through the previously excited atoms. Energy losses will occur, of course, at the reflecting surfaces, but amplification by stimulated emission may be great enough to overcome such losses, so that a steady wave will buildup on the box.

Accordingly, one form of an optical maser oscillator includes two oppositely disposed mirrors so that a wave or photon may start near one mirror, travel in a direction parallel to the axis of the system while growing because of stimulated emission until it reaches the other mirror. It will then be reflected back into the active medium, stimulate emission from excited atoms, and continue to grow in intensity. If the gains in energy resulting from stimulated emission during repeated passages between the mirrors exceed the reflective losses occurring at the mirrors, the wave will continually buildup until the energy of the waves passing through the mirrors equals the energy supplied by pumping. The waves escaping through the mirrors constitute the maser output.

Waves which are inclined to the axis of such an optical maser system will die out after a few reflections, usually because they soon escape through the sidewalls of the box before they have sufficient time to build up in power through stimulated emission. Thus, it is only the photons or waves, which travel precisely parallel to the axis of the mirror system, i.e., normal to the reflecting surfaces thereof, which are amplified and may thus be useful for various maser purposes.

Waves which are emitted from such an optical maser oscillator system are very powerful, essentially monochromatic and coherent. Furthermore, the output of such a maser system is directional because the waves emitted are travelling almost perfectly parallel to the axis of the system.

This phenomenon is diagrammatically indicated in FIG. 2. Suppose a beam of light having a wavelength P passes through a gas composed of atoms having the energy levels shown in FIG. 2. If P is a characteristic wavelength of these atoms, some of the light energy will be absorbed by interaction with the atoms. For example, atoms in the ground state may be raised to energy level B. Some of these atoms will then spontaneously drop to the ground state while emitting light at wavelength P in random directions, thus "scattering" the incident light beam. Other atoms at the excited level B will spontaneously decay to level A, emitting in random directions wavelength Q. These atoms will then go to the ground state, emitting in random directions, at wavelength R. Still other atoms will give up energy by colliding with other atoms or with the walls of the container producing no radiation. A few atoms which were at level B before the beam was turned on, or were raised to level B by absorption from the incident beam, will be stimulated by the beam to emit light at wavelength P to increase the strength of the beam.

The number of atoms in a normal gas in a given excited state is inversely proportional to the energy at that level. Thus, in the gas discussed with respect to FIG. 2, there would be more atoms in the ground state than at level A, and more atoms at level A than at level B. Thus, in such a situation the net effect is absorption and scattering of a light beam at the wavelength P.

If, however, more atoms of this gas were at level B than at level A, a beam of light at the wavelength Q passing through the gas would be amplified, because the number of atoms at level B that would be stimulated to emit radiation while going from level B to level A would be greater than the number of atoms at level A absorbing radiation when going from level A to level B. This situation, wherein more atoms are at a higher energy level than at a lower energy level, is called an "inverted population."

If more atoms in the ground state can be continuously raised to level B, either through the absorption of light of wavelength P or through some other effect, there will continuous amplification of light at wavelength Q; this is maser action.

Continuing our analogy, we may provide apparatus to add energy to a volume of gas in such manner that more of the atoms are in energy level B than energy level A. We may contain this inverted population in a resonator comprising plane parallel mirrors on the opposite sides of this volume. Many excited atoms at level B will spontaneously emit light at wavelength Q at random times and in random directions. Most of this light will rapidly pass out of the gas. However, the light which is directed precisely normal to the parallel mirrors is reflected back and forth between the mirrors, thereby stimulating other atoms to emit light at wavelength Q precisely in phase with and in the direction of motion of the stimulating light. As a result, a beam of light will be created medium" the gas, the "active medium," which will be continuously amplified as it reflects back and forth between the two "resonator" mirrors. If some of this light is allowed to escape through one of the mirrors, it will emerge as very powerful plane waves at Q wavelength.

Such a gaseous optical maser light source was first reported by A. Javan, W. R. Benett, Jr., and D. R. Herriott in the Feb. 1, 1961, issue of *Physical Review Letters*.

The optical maser which is the subject of the present invention uses as its active medium a mixture of helium and neon gases. Relevant energy levels of these gases for maser action are illustrated in FIG. 3. In helium-neon masers of this type the inverted population may be obtained by exciting helium atoms to level A, in FIG. 3, by means of a direct current discharge or an alternating electric field having a frequency of approximately 28 megacycles per second. Many of the helium atoms at level A collide with neon atoms in the ground state. Because the excited state B of the neon atoms is at nearly the same energy level as the excited state A of helium, the energy of an excited helium atom can be transferred to the ground state of a neon atom. The slight difference in energy between level A and level B is converted into motion of the colliding atoms. The helium atom involved in a collision returns to the ground state and the neon atom is excited to level B. The neon atom will then spontaneously, or through stimulated emission, decay to level C emitting at a characteristic wavelength of 6,328 angstroms. An angstrom is one hundred millionth of a centimeter. Thus the maser produces visible red light.

The neon atom will then spontaneously emit radiation (not involved in the maser action) in going from level C to level D after which it returns to the ground state. Special mirrors are used which only reflect a narrow band of wavelengths around 6328 angstroms so that the helium-neon optical maser will produce a beam of this wavelength through stimulated emission.

More atoms can be maintained at energy level B of neon that at energy level C of neon, i.e., in an inverted population state because a neon atom will remain at level B much longer than at level C. Level B is therefore called a "metastable" state or level.

See *Continuous Gas Maser Operation in the Visible* by A. D. White and J. D. Rigden, Proceedings of the IRE (correspondence) p1697 July 1962.

The mirrors used in early helium-neon masers were extremely flat plates coated with 13 alternate layers of zinc sulfide and magnesium fluoride, and the helium-neon mixture was in intimate contact with these plates. These mirrors are as reflective as possible reflecting almost 100 percent of the light falling on them. The transmitted light is the output of the device and is an extremely parallel, very intense beam of light of plane wave fronts.

These are a plurality of states of neon adjacent to states or levels B and C shown in FIG. 3 and stimulated emission may take place between many of them. In particular the neon atoms can be stimulated to emit at a nonvisible infrared wavelength of 33,920 angstroms in going from energy level B to energy level E of neon as shown in FIG. 3. In fact it is many hundreds of times more likely that a neon atom in an optical maser at level B will go to level E rather than to level C if the mirrors are equally reflective at the two wavelengths. See: *The Interaction of Visible and Infrared Maser Transactions in the Helium Neon System* by J. D. Rigden and A. D. White, Proceedings of the IEEE (Correspondence) p. 943, June 1963.

A commercial gaseous optical maser of the prior art is disclosed in the copending application of John C. Atwood et al., Ser. No. 266,912 filed Mar. 21, 1963 entitled "Optical Masers." Said application is assigned to the same assignee as the present application and is incorporated herein by reference.

In the maser of the above-identified application, the gas plasma which may be a mixture of helium and neon is confined within an elongated cylindrical discharge tube formed of fused silica (artificial quartz) approximately 60 centimeters in length. The inner diameter of the discharge tube is 5 millimeters. The inverted population is produced by exciting the gas mixture within the tube by means of a radiofrequency discharge between electrodes external to the tube. The frequency of this discharge is approximately 28 megacycles.

The maser of the above-identified application may employ external concave spherical mirrors separated by a distance approximately equal to their radius of curvature. Such mirrors are called confocal. The ends of the discharge tube are sealed with flat transparent windows mounted at Brewster's angle to the optical axis of the discharge tube and at twice this angle to each other. In this manner light that has reflected back and forth through the plasma tube between the confocal mirrors is caused to be plane polarized, and the optical axes at the ends of the discharge tube are coincident. The confocal external mirrors are very easy to align to produce maser action. The beams transmitted by the mirrors have curved wave fronts of the same curvature as the mirrors.

PROBLEMS OF THE PRIOR ART

The maser of the above-identified copending application is rather large and bulky for use in the laboratory. It requires an external oscillator and power supply, certain elements of which are preferably mounted to the discharge tube, along with the external electrodes, which increases the bulk of the device. The high-frequency power supply generates radio interference which may be undesirable. Furthermore, it is difficult to provide a uniform radiofrequency gas discharge over an appreciable length. A nonuniform discharge is undesirable because it produces uncontrolled variations in the wave front of radiation passing therethrough.

On the other hand, it has been considered impractical to manufacture commercially a direct current discharge plasma tube since the required internal electrodes introduce contaminants into the tube shortening its useful lifetime.

DISCOVERIES

As stated in the above-identified copending application, it has been considered desirable to maximize the ratio of the area of the inner surface of the discharge tube to the volume of gas contained in the tube, because depopulation of state D of FIG. 3 takes place at the walls of the tube. I have discovered that the life of gaseous optical masers may be increased when using very thin discharge tubes by allowing the plasma within the tube to be in free communication with a large reservoir of the gas. I have further discovered that the electrodes for producing a discharge in a thin plasma tube may be mounted within these large reservoirs external to the plasma tube. This facilitates the construction of optical masers utilizing extremely thin diameter capillary tubes.

I have found that a helium-neon optical maser constructed in accordance with my discoveries utilizing a very thin, comparatively short capillary tube communicating with gas reservoirs wherein direct current electrodes are located, may be amplitude modulated to radio frequencies by varying the discharge current within the plasma. I have thus modulated helium-neon maser beams to frequencies of the order of 500 kilocycles per second.

I have further discovered that maser action at undesired wavelengths may be suppressed by forming the windows of the discharge tube into very small angle wedges.

OBJECTS OF THE INVENTION

It is therefore an object of the present invention to provide an optical maser for fluid active media that is rugged, compact, light in weight, low in manufacturing cost, and convenient to use.

Another object of the invention is to provide such an optical maser that may be excited from a direct current power supply.

A further object of the invention is to provide an optical maser of the above character employing internal electrodes.

Still another object of the invention is to provide an optical maser of the above character employing a hot cathode.

Yet another object of the invention is to provide an optical maser of the above character of increased optical gain per unit length.

A still further object of the invention is to provide an optical maser of the above character providing an optical path through the active media of greater optical uniformity.

Another object of the invention is to provide an optical maser of the above character that may be electrically modulated at radiofrequencies.

A further object of the invention is to provide an optical maser of the above character wherein amplification at undesired wavelength is suppressed.

Still another object of the invention is to provide an optical maser of the above character having a long useful life.

A further object of the invention is to provide an optical maser of the above character wherein the resonator mirrors may be conveniently angularly adjusted, yet are relatively immune from jitter and drift in angular setting.

A still further object of the invention is to provide an optical maser of the above character employing a gaseous active medium.

Another object of the invention is to provide an optical maser of the above character employing a mixture of helium and neon as the active medium.

A further object of the invention is to provide a discharge tube for an optical maser of the above character utilizing a substantially all glass construction.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

THE DRAWINGS

For a fuller understanding of the nature and objects of the invention, reference should be had to the following detailed description taken in connection with the accompanying drawings in which:

FIG. 1 is a diagram contrasting stimulated emission with absorption and spontaneous emission;

FIG. 2 is an energy level diagram of a hypothetical element capable of maser action;

FIG. 3 is an energy level diagram of helium and neon showing some of the energy levels that may be involved in stimulated emission from the optical maser discharge tube of the present invention;

FIG. 4 is a side view, partially in cross section, of an optical maser discharge tube according to the preferred embodiment of the present invention;

FIG. 5 is a side view, partially in cross section, of the preferred embodiment of the invention employing the optical maser discharge tube of FIG. 4;

FIG. 6 is an enlarged end view, partially in cross section, of the optical maser of FIG. 5;

FIG. 7 is an enlarged partial cross-sectional view taken along the line 7—7 of FIG. 6;

FIG. 8 is an enlarged perspective exploded view, partially in cross section, of one end of the optical maser of FIG. 5;

FIG. 9 is a diagram showing the alignment of the resonator mirrors and discharge tube windows of the optical maser of FIG. 5;

FIG. 10 is a cross-sectional view taken along the line 10—10 of FIG. 5; and,

FIG. 11 is a partial cross-sectional view taken along the line 11—11 of FIG. 5.

The same reference characters refer to the same elements throughout the several views of the drawings.

GENERAL DESCRIPTION

The optical maser of the present invention in general comprises a direct current excited discharge tube employing a heated cathode. A cylindrical plasma confining capillary tube having an inner diameter of 2 millimeters and approximately 22 centimeters long is supported within the discharge tube. The outer envelope of the discharge tube forms two independent gas reservoirs each coaxial with the plasma confining capillary tube. Each reservoir extends over and encloses approximately one-half of the capillary tube, and each reservoir communicates with one end of the capillary tube.

The ends of the discharge tube are closed in the manner of conventional electronic tube bases having metal leads passing therethrough and having a central outwardly extending cylindrical stem. A Brewster angle window is mounted to each of these stems in optical alignment with the plasma confining capillary tube. All of the components of the discharge tube are fabricated of conventional glass except for the windows which are formed of artificial quartz to obtain the greatest possible optical homogeneity.

An electrode is mounted within each of the reservoirs of the discharge tube, inwardly of the end of the plasma confining capillary tube, as shown in 54 in FIG. 4. Preferably, a heated cathode is used. Because the lifetime of the cathode can be the limiting factor in the lifetime of the discharge tube, I prefer to provide more than one cathode so that if one burns out, another may be used. Conventional flashed barium getters are mounted within each reservoir, as shown at 74 in FIG. 4.

As stated above, I have found that when it is desired to operate the above-described discharge tube containing a mixture of helium and neon as an optical maser emitting visible light at 6,328 angstroms, or at several other wavelengths known in the art, it is desirable to suppress maser oscillations at an infrared wavelength of 3,3920 angstroms. I found that this can be conveniently accomplished by forming each Brewster angle window so that the surfaces thereof, rather than being parallel, are offset at an angle of approximately one-half degree. The windows are preferably mounted such that the line of intersection of the planes of the surfaces of one window is parallel and on the same side of the discharge tube, as the line of intersection of the planes of the surfaces of the other window. In this manner, I obtained 5 minutes of dispersion between axial rays of visible and infrared radiation within the resonator cavity and the mirrors can then be selectively aligned with the desired visible radiation.

The above-described discharge tube is preferably mounted within a cylindrical support which may be of aluminum or, if a great degree of temperature stability is desired, of material such as invar. A mirror holder is mounted at each end of the support in axial alignment with the windows and the plasma confining capillary tube. Each mirror holder comprises a relatively stiff yet flexible diaphragm in which is mounted the mirror mount proper. Each holder is provided with three setscrews acting against the mirror mount such that the mirror mount may be angularly adjusted about orthoganal axes against the restraint of the flexible diaphragm.

I have found that the above described optical maser employing a mixture of helium and neon may be operated at a direct current potential of 1,000 volts between its electrodes and at currents of approximately 5 to 10 milliamps. The current of the discharge may be modulated. This will produce a corresponding modulation of the intensity of the maser beam. I have found that the 2 millimeter inner diameter capillary tubes of the discharge tube described above permits the beam to be thus amplitude modulated to frequencies as high as 500 kilocycles per second.

SPECIFIC DESCRIPTION

Now referring in greater detail to the preferred embodiment of FIG. 4, the discharge tube generally indicated at 30 comprises an elongated cylindrical plasma confining capillary tube 32, approximately 22 centimeters long, having an inner diameter of 2 millimeters, and an outer diameter of 4 millimeters. Enlarged reservoirs 34 and 36 are formed about either end of the plasma confining capillary tube 32 within a surrounding coaxial outer cylindrical tube 38. Tube 38 is 1¼ inches in diameter and has a wall thickness of one-sixteenth inch.

Smaller discharge tubes having capillary tubes approximately 10 centimeters in length, inner diameters of 1 to 1.5 millimeters and outer diameters of 6 millimeters have also been fabricated. The outer reservoir defining tubes 38 of these discharge tubes are approximately 1.8 centimeters in diameter.

The mid portion 40 of the outer tube 38 is drawn down into contact with the capillary tube 32 (see FIG. 5). This forms a wall portion 39 sealing off reservoirs 34 and 36 and supporting the tube 32.

The ends of the discharge tube 30, generally indicated at 42 and 44 are formed as conventional electron tube bases. Brewster angle windows 46 and 48 are held in optical contact with the ends of the bases 42 and 44 by means of cement sealants 50 and 52. All of the above described elements, except the windows 46 and 48, are formed of conventional tube glass such as Corning glasses Nos. 7,052 or 7,056. In order to provide the highest possible degree of optical homogeneity, the windows 46 and 48 are made of artificial quartz.

Referring to FIGS. 4 and 10, an anode 54 is mounted within reservoir 34 on three pins 56, 58 and 60. The anode is a flat molybdenum strip formed into an equilateral triangle supported by the three pins which are Kovar, 0.040 inch in diameter.

Now referring to FIGS. 4 and 11, a plurality of cathodes 62, 64 and 66 are mounted within reservoir 36 on 0.040 inch Kovar pins 68, 70 and 72. The cathodes are formed of nickel type 220, coated with a commercial oxide coating. The cathodes are directly heated and of double wound spiral configuration.

Again referring to FIG. 4, Kemet barium KIC getters 74 and 76 are mounted within the reservoirs 34 and 36 respectively.

After fabrication, the discharge tube 30 is cleansed, evacuated and filled with an active medium through nipple 78, which is then sealed. When the active medium is a mixture of helium and neon, the optimum pressure is 2 millimeters of mercury, but the pressure may be varied from approximately one-half millimeter to 5 millimeters of mercury. The optimum ratio of helium to neon is 7 to 1, but this ratio may be varied from approximately 2 to 1 to 20 to 1.

Before the discharge tube 30 has been filled with a helium-neon mixture, the getters 74 and 76 are flashed by means of an external RF source and the barium thereof is boiled off and forms an extremely thin deposit on the adjacent inner surfaces of the tube reservoirs 34 and 36. The barium is of course highly active and combines with various contaminants that may find their way into the discharge tube 30.

Now referring to FIG. 5, the discharge tube 30 is preferably housed within a cylindrical housing and support 80 provided with a plurality of vent holes 82 so that the discharge tube may be cooled by a natural convection of air throughout the housing 80.

The discharge tube 30 is supported within the housing 80 by means of a plurality of nylon screws 84, or the like, threaded in the housing 80 into contact with the outer surface of the discharge tube 30. If greater axial support is desired, conventional electronic tube sockets (not shown) may be supported within the housing 80 engaging the pins 56, 58, 60 and 68, 70 and 72 of the electrodes.

Identical mirror supports indicated generally at 86 and 88 are mounted to the ends of the housing 80. Referring now to FIGS. 7 and 8, mirror support 86 comprises a relatively stiff but flexible diaphragm 90 retained between two rings 92 and 94 clamped together by a plurality of screws 96 (FIG. 6). The rings 92 and 94 after being assembled with screws 96 are mounted to the housing 80 by means of a plurality of screws 98. A mirror holder 100 is rigidly affixed in a central aperture in diaphragm 90. A resonator mirror 102 having a multiple layer dielectric coating 104 selectively reflective at the desired maser wavelength on the inner side thereof is held in mirror holder 100 against an annular boss 106 by a resilient O-ring 108 and a retaining ring 110.

Rigidly attached to ring 92 is an adjustment screw support 112. Adjustment screws 114 and 116 are spaced therein concentrically about the mirror 102 at an angle of approximately 160°. A third fixed screw 118 is located therein closer to the mirror 102 such that screws 116 and 118 define an axis perpendicular to the axis defined by screws 114 and 118. Mirror holder 100 has an annular flange 120 against which the adjustment screws 114 and 116 are fixed screw 118 bear. Thus, the resonator mirror 102 may be angularly adjusted about two mutually orthogonal axes by adjusting screws 114 and 116 against the restraining force developed by deflection of the diaphragm 90.

A dust sleeve 122 engages mirror holder 100 and the tube base 42 to prevent entry of dust and other contaminants into the maser beam. A similar dust sleeve 124 is located at the opposite end of the discharge tube 30 (see FIG. 5). These sleeves may be neoprene, polyethylene or any other convenient flexible material that will tightly engage the surfaces of the mirror holder 100 and the ends 42 and 44 of the discharge tube 30.

An annular metallic sleeve 124 is rigidly attached to ring 92 and this may be provided with threads 126 or other convenient standard attachment means so that conventional optical instruments may be attached to the housing 80 to intercept the maser beam. In the preferred embodiment shown in FIGS. 7 and 8 the ring 92 is formed as a flange integral with the external threaded sleeve 124.

Now referring to FIG. 9, the configuration of the windows 46 and 48, the left resonator mirror 102 and a right resonator mirror 128 is shown schematically. In FIG. 9, various proportions have been enlarged for purposes of illustrating the invention.

The windows 46 and 48 are mounted to the ends of the discharge tube such that the angle "$a$" between their surfaces is substantially twice Brewster's angle so that the optical axes at the opposite ends of the discharge tube will be coincident as described in the above-identified application Ser. No. 266,912.

The mirrors 102 and 128 are here shown to be confocal, but other configurations known in the art such as hemispherical or plane parallel may be employed. The windows 46 and 48 are slightly wedge shaped, the angles "$b$" and "$c$" being approximately one half degree. This wedging of the windows 46 and 48 produces an angular separation or dispersion between a visible ray 130 at 6,328 angstroms and the very high gain infrared ray 132 at 33,920 angstroms of 5 minutes of arc. This is enough to facilitate adjustment of the mirrors 102 and 128 whereby only the desired maser oscillations at the visible wavelengths will occur, since the mirrors may be adjusted to only reflect the visible ray 130 back along its original path to sustain the maser operation. In this manner, very little of the available power is lost in producing an output at 33,920 angstroms.

The planes of the surfaces of window 46 intersect along a line 47 perpendicular to the plane drawing in FIG. 9. Similarly the planes of the surfaces of window 48 intersect at line 49. When, as preferred, both windows are oriented at Brewster's angle, line 47 and 49 are parallel, and when, as further preferred, the windows are oriented at twice Brewster's angle to each other, as shown in FIG. 9, lines 47 and 49 are parallel and on the same side of a line passing through both windows.

Again referring to FIG. 4, the maser is operated by applying approximately 1,000 volts potential between the anode 54 and the cathodes 62, 64 and 66 from a conventional power supply while supplying current through one of the cathodes to heat it, also in the conventional manner.

I find that, using the configuration of the maser shown in FIGS. 4 and 5, the discharge confined within the capillary tube 32 is extremely uniform and easily provides single mode operation wherein limited." wave front of the radiation precisely corresponds to the surface of the resonator mirrors 102 and 128, the only deviation being that produced by diffraction of the radiation due to the aperture of the plasma tube. Thus the maser output is "diffraction limited."

Furthermore, the small discharge tubes employing capillaries approximately 10 centimeters long and 1 to 1.5 millimeters in diameter may be used in oscillators producing a single frequency output. Larger tubes will simultaneously provide several frequencies; the difference between the frequencies being equal to the velocity of light divided by twice the distance between the resonator mirrors. The small diameter capillary discharge tubes are required to provide sufficient amplification in the short tubes to maintain oscillation.

Although the discharge tube 30 is only about 12 inches long and the beam is only 2 millimeters in diameter, the total power of the maser beam is several milliwatts being greater than that achieved with the 24-inch long large diameter discharge tube of the above-identified copending application, Ser. No. 266,912.

I have also found that the entire discharge tube 30, except for the electrodes, may be made of ordinary glass which is much less expensive than the quartz used in prior art optical masers of this type. I have further found that the very small bore capillary plasma confining tube 32 permits amplitude modulation of the maser output beam to radio frequencies by merely varying the amount of current in the discharge. In this manner information may be transmitted on the maser beam to remote distances where the modulated maser beam may be demodulated by conventional means and the information recovered.

It will be understood by those skilled in the art that the discharge tube 30 may be filled with other fluid active media, particularly various gases, and that the discharge tube 30 when filled with any active medium is an amplifier of light at the characteristic maser wavelengths of that active medium and may be so employed in other systems than the maser oscillator of FIG. 5.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which as a matter of language, might be said to fall therebetween.

Having described my invention, what I claim as new and desire to secure by Letters Patent is:

1. An optical maser oscillator comprising in combination:
   A. an elongated generally cylindrical rigid support member;
   B. a pair of mirror mounts
      a. one attached to each end of said support member and each mounting a mirror,
      b. at least one mirror mount comprising
         1. a thin flexible diaphragm,
         2. a mirror holder substantially centrally affixed to said diaphragm, and
         3. adjustment means bearing against said mirror holder for tilting said mirror holder against the restraint of said flexible diaphragm;
   C. a closed vessel comprising
      a. an elongated cylindrical outer tube;
      b. a pair of end walls
         1. each end wall including an outwardly extending cylindrical stem closing the ends of said outer tube, said stems disposed in alignment with and between said mirrors and
         2. each end wall having a plurality of electrical conductors passing therethrough,
      c. an inner elongated plasma tube in alignment with and extending between said cylindrical stems, and
      d. a barrier dividing said elongated outer tube into two reservoirs and supporting said plasma tube;
   D. a pair of windows
      a. each affixed to the end of one of said stems and
      b. at least one of said windows being wedge shaped to provide angular dispersion of radiation passing therethrough;
   E. a gas capable of maser action enclosed in said vessel;
   F. an anode
      a. supported on at least one of said conductors within one of said reservoirs inwardly of one end of said plasma tube; and
   G. more than one thermionic cathode
      a. supported on the other of said conductors within the other of said reservoirs inwardly of the end of said plasma tube; and
   H. a getter in at least one of said reservoirs.

2. The combination defined in claim 1 wherein said optical maser elements are substantially cylindrically symmetrical about the axis of said plasma tube.

3. In an optical maser, the combination comprising:
   A. a closed vessel comprising
      a. an elongated cylindrical outer tube;
      b. a pair of end walls
         1. each including an outwardly extending cylindrical stem and electrical conductors passing therethrough, and
         2. each closing one end of said elongated outer tube,
      c. an inner elongated plasma tube extending coaxially between said stems, and
      d. a barrier dividing said elongated outer tube into two reservoirs and supporting said plasma tube;
   B. a pair of windows
      a. each affixed over the end of one of said stems, and
      b. at least one of said windows being wedge shaped to provide angular dispersion of radiation passing therethrough;
   C. a gas capable of maser action enclosed in said vessel;
   D. an anode
      a. supported on at least one of said conductors within one of said reservoirs inwardly of one end of said plasma tube;
   E. more than one thermionic cathode
      a. supported on said conductors within the other of said reservoirs inwardly of the other end of said plasma tube; and
   F. a getter in one of said reservoirs.

4. The combination defined in claim 3 wherein said getter is barium.

5. The combination defined in claim 3 wherein said plasma tube is a small diameter substantially cylindrical capillary tube.

6. The combination defined in claim 3 wherein said elongated cylindrical outer tube is constricted in the middle against said plasma tube to form said barrier.

7. In an optical maser, the combination comprising:
   A. a closed vessel;
   B. a fluid capable of maser action enclosed in said vessel;
   C. power means coupled to said fluid for establishing an inverted population in the fluid enclosed in said vessel; and,
   D. a pair of windows
      a. of material transparent to stimulated radiation from said fluid,
      b. each of said windows comprising a pair of plane surfaces forming an acute angle therebetween, and
      c. said windows being disposed adjacent opposed ends of said vessel and oriented to each other such that a straight line passing through the fluid in said vessel may intersect both of said windows substantially at Brewster's angle.

8. The combination defined in claim 7 wherein the lines of intersection of the planes of the surfaces of said windows are parallel and on the same side of a line passing through both said windows at Brewster's angle.

9. In an optical maser, the combination comprising:
   A. a closed vessel;
   B. a fluid capable of maser action enclosed in said vessel;
   C. power means coupled to said fluid for establishing an inverted population in the fluid enclosed in said vessel; and,
   D. a pair of windows
      a. of material transparent to stimulated radiation from said fluid,
      b. each said window comprising a pair of plane substantially parallel surfaces,
      c. said windows being disposed adjacent opposed ends of said vessel and oriented such that a straight line passing through the fluid in said vessel may intersect both of said windows substantially at Brewster's angle, and
      d. the plane surfaces of at least one of said windows being formed at a small angle to provide a controlled amount of angular dispersion in the radiation passing therethrough.

10. The combination defined in claim 9 wherein the planes of the surfaces of one of said windows intersect the planes of the surfaces of the other of said windows substantially at twice Brewster's angle for the material of the windows at the wavelength of radiation stimulated from said fluid.

11. In an optical maser, the combination comprising:
    A. a closed vessel;
    B. a fluid capable of maser action enclosed in said vessel;
    C. power means coupled to said fluid for establishing an inverted population in the fluid enclosed in said vessel; and,
    D. a pair of windows, one adjacent each end of said vessel,
       a. of material transparent to stimulated radiation from said fluid,
       b. each said window comprising a pair of plane substantially parallel surfaces, and c. the plane surfaces of at least one of said windows being formed at a small angle to provide a controlled amount of angular dispersion in the radiation passing therethrough.

12. An optical maser oscillator cavity comprising in combination:
   A. an elongated generally cylindrical rigid support member; and,
   B. a pair of mirror mounts
      a. each attached to an end of said support member
      b. at least one mirror mount comprising
         1. a thin, flexible diaphragm,
         2. a mirror holder generally centrally affixed in said diaphragm, and,
         3. adjustment means carried by said support member and bearing against said mirror holder for tilting said mirror holder against the restraint of said flexible diaphragm.

13. The optical maser oscillator cavity defined in claim 12 wherein said adjustment means comprises a fixed pin and a pair of adjustable pins bearing against said mirror holder forming therebetween two perpendicular axes.

* * * * *